United States Patent
Fujiyoshi

(10) Patent No.: US 7,475,362 B2
(45) Date of Patent: Jan. 6, 2009

(54) INFORMATION PROCESSING APPARATUS, FILE PROCESSING METHOD, AND COMPUTER-READABLE MEMORY MEDIUM AND PROGRAM

(75) Inventor: Hiroyuki Fujiyoshi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 880 days.

(21) Appl. No.: 10/366,510

(22) Filed: Feb. 14, 2003

(65) Prior Publication Data

US 2003/0156479 A1 Aug. 21, 2003

(30) Foreign Application Priority Data

| Feb. 18, 2002 | (JP) | ............................. 2002-039781 |
| Feb. 18, 2002 | (JP) | ............................. 2002-039782 |
| Feb. 4, 2003 | (JP) | ............................. 2003-026571 |

(51) Int. Cl.
*G06F 3/00* (2006.01)

(52) U.S. Cl. ........................ 715/838; 715/835; 715/752; 715/810; 715/813; 715/864; 358/1.16; 358/402

(58) Field of Classification Search ......... 715/835–839, 715/752, 810, 813, 864, 866; 358/1.12, 1.16, 358/402
See application file for complete search history.

(56) References Cited

U.S. PATENT DOCUMENTS

| 5,835,820 | A | * | 11/1998 | Martin et al. ................. 399/85 |
| 5,995,986 | A | | 11/1999 | Ueda et al. .................. 707/516 |
| 6,351,547 | B1 | * | 2/2002 | Johnson et al. ............. 382/128 |
| 6,614,550 | B1 | * | 9/2003 | Minagawa .................. 358/1.15 |
| 7,042,585 | B1 | * | 5/2006 | Whitmarsh et al. ........ 358/1.15 |
| 2001/0029521 | A1 | * | 10/2001 | Matsuda et al. ............. 709/201 |
| 2001/0044868 | A1 | * | 11/2001 | Roztocil et al. ............. 710/129 |
| 2001/0052993 | A1 | * | 12/2001 | Lumley ..................... 358/1.12 |
| 2002/0080376 | A1 | * | 6/2002 | Momose et al. ............. 358/1.9 |
| 2003/0084006 | A1 | * | 5/2003 | Hobbs ........................ 705/400 |

FOREIGN PATENT DOCUMENTS

CN 1244684 A 2/2000

OTHER PUBLICATIONS

David Pogue, "Windows XP Home Edition: The Missing Manual", May 2002, O'Reilly, ISBN: 0-596-00260-2, Sections 3.2, 4.1, 4.3, and 6.5.*
Larry Magid, "Little PC Book, Windows XP Edition, The", Dec. 2001, Peachpit Press, Examiner numbered pp. 1-12.*

* cited by examiner

*Primary Examiner*—Stephen S Hong
*Assistant Examiner*—Ryan F Pitaro
(74) *Attorney, Agent, or Firm*—Fitzpatrick, Cella, Harper & Scinto

(57) ABSTRACT

An object of the invention is to freely construct a file processing environment in which when a file is thumbnail displayed, print attributes held in the relevant file can be easily and visually discriminated from the displayed thumbnail. In an information processing apparatus by which a file which holds predetermined attributes can be stored, a CPU obtains image attributes and print attributes from attributes of the file stored in an external storing apparatus, forms a reduction image to which the print attributes are reflected as an image on the basis of the obtained image attributes and print attributes, and displays the formed reduction image to a display apparatus.

18 Claims, 13 Drawing Sheets

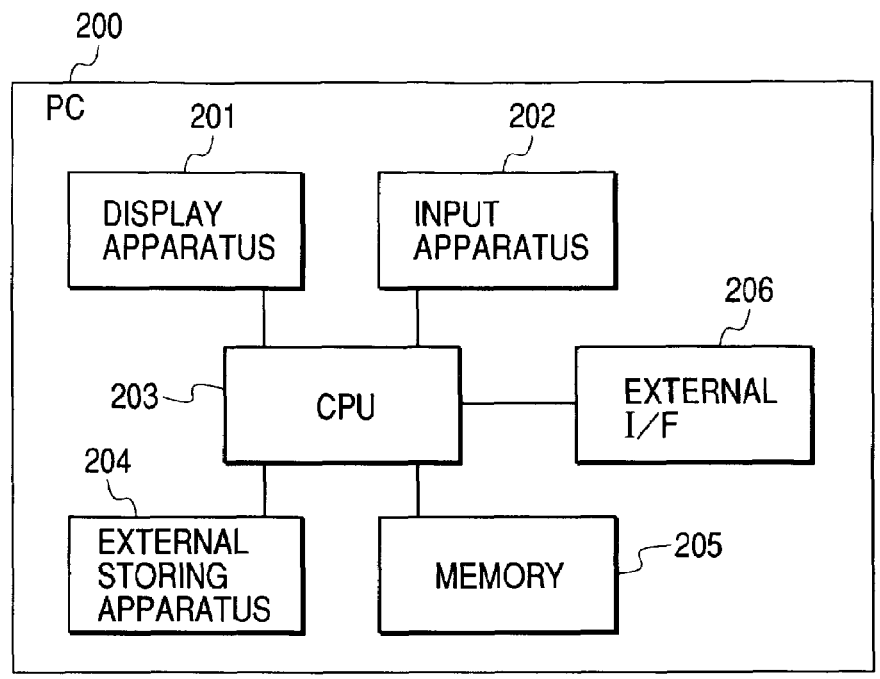
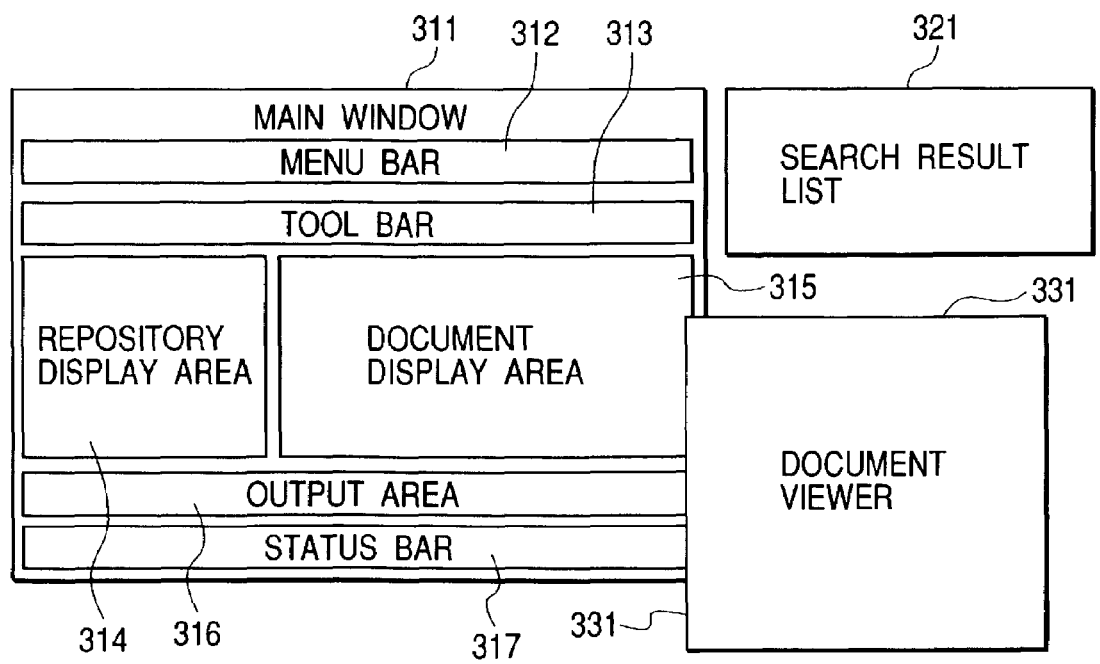

FIG. 4

FILE FORMAT OF DOCUMENT WITH PRINT ATTRIBUTES 400

| | | |
|---|---|---|
| DOCUMENT NAME | α | ⎫ |
| ACTUAL IMAGE | A.BMP | ⎪ |
| RESOLUTION | DPI | ⎬ FORMAT OF DOCUMENT DATA |
| DOCUMENT OF IMAGE | PORTRAIT | ⎪ |
| IMAGE SIZE | XX × YY | ⎭ |
| PRINT ATTRIBUTE 1 | Z-FOLDING=TRUE | ⎫ |
| PRINT ATTRIBUTE 2 | BOOKLET PRINTING=FALSE | ⎬ FORMAT OF PRINT ATTRIBUTES |
| . . . | | ⎪ |
| PRINT ATTRIBUTE 8 | STAPLING=OFF | ⎭ |

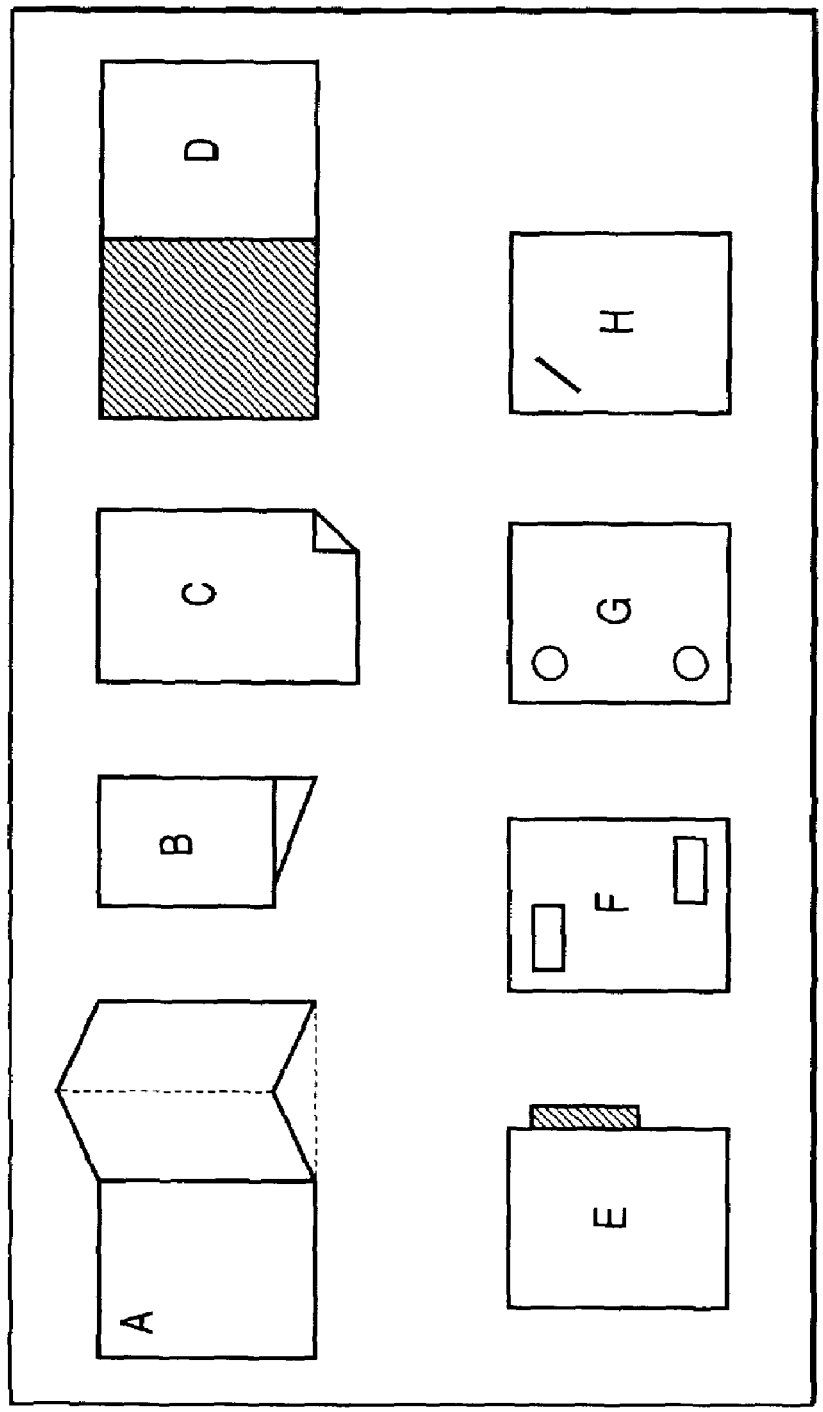

EXAMPLES OF THUMBNAIL

FIG. 12

MEMORY MEDIUM SUCH AS FD/CD-ROM

| DIRECTORY INFORMATION |
|---|
| THE 1ST DATA PROCESSING PROGRAM<br>PROGRAM CODE GROUP CORRESPONDING TO STEPS IN FLOWCHARTS SHOWN IN FIGS. 6, 10, AND 11 |
| |

MEMORY MAP IN MEMORY MEDIUM

INFORMATION PROCESSING APPARATUS, FILE PROCESSING METHOD, AND COMPUTER-READABLE MEMORY MEDIUM AND PROGRAM

BACKGROUND OF THE INVENTION

1. Field of the Invention

The invention relates to an information processing apparatus, a file processing method, and computer-readable memory medium and program, in which an image file or an application file is stored into a storing apparatus such as an external storing apparatus or the like and managed and an image of such a file is displayed as a thumbnail image as a reduction image.

2. Related Background Art

Hitherto, there is a document management application for managing a text file or an image file in an information processing apparatus. A program according to the invention is one of such applications. The document management application has: a function such that an image file (BMP/JPEG/TIFF, etc.) or a file formed by another application is fetched by an importing operation, a scanning operation from a scanner, or an operation such as direct repository, printing, or the like from another application, stored into a storing apparatus such as an external storing apparatus or the like, and managed in accordance with a folder structure; a function for visually displaying an image of such a file as a thumbnail image as a reduction image; a function for displaying a list of statuses of respective documents; a function for extracting a character string for whole-document search from the stored and managed file and executing the whole-document search; a function for extracting the stored file to a location out of the application; and a function for outputting the stored file to a mail system or printing by a printer. That is, the document management application is an application which can reposit, search, and extract office documents formed in a general office.

According to the document management application, a plurality of data files (text file, image file, etc.) stored in the information processing apparatus are displayed as thumbnail images, thereby enabling the user to visually recognize them.

In recent years, in accordance with the spread of digital hybrid copying apparatuses each having a finisher which can realize a booklet function, a use method of not only instructing contents of booklet from an operation panel of the copying apparatus and using the instructed contents as a result of the copying apparatus but also directly printing in a format corresponding to the finisher in the case of printing from the application is increasing. In such a case, a printer driver has a function which can be used by the finisher.

In the above case, since print attributes need to be designated every printing, when print data is printed again in the same setting format after completion of the printing, it is necessary to store its printing method, store it into a log, or the like.

The following techniques have been considered in order to reduce such a burden on the user. First, a data file such as text file, image file, or the like is stored in an intermediate format and such a file is enabled to be opened by an application which can handle such a format. Thus, data files separately formed by a plurality of applications can be opened by a common application.

Second, a print setting function is implemented to the common application, thereby enabling various settings upon printing (a printing method (duplex, simplex, or booklet printing), a print layout (Nup or poster printing), a color processing mode, additional information settings (watermark, background, date, and user name), and the like) to be performed to the data file. A data format in which those print settings have been described in an attribute information area of the data file is prepared. Thus, in the case of printing the text file or the image file which has been constructed in a common data format, without newly performing a print setting, print data can be formed by using the print settings which have already been set in the data format. A burden such that the user has to perform the print settings (hereinafter, also referred to as print attributes) every printing can be reduced.

However, although the data file can be displayed as a thumbnail image in the conventional technique of the document management application as mentioned above, according to the conventional thumbnail display, since the data file is processed as a display of only image attributes, even in the case of a data file having print attributes, the print attributes (Z-folding, staple, punch) are not applied as they are to the thumbnail but a representative page (the first page of a document) is merely thumbnail displayed in a manner similar to the conventional one. Therefore, to distinguish a document with print attributes in a print management system, there is only a method of examining a property or displaying the attributes as document data in a list display mode. There is, consequently, a problem such that its operation is complicated and a print format cannot be intuitively grasped as an image from the thumbnail of the file.

SUMMARY OF THE INVENTION

The invention is, therefore, made to solve the foregoing problems and it is an object of the invention to make it possible to freely construct a file processing environment in which when a representative page of a data file is thumbnail displayed, print attributes which are held in the file can be easily and visually discriminated from the displayed thumbnail image.

It is another object of the invention to provide an information processing apparatus, a file processing method, and computer-readable memory medium and program, in which in an information processing apparatus which can store a file which holds predetermined attributes, it is possible to freely construct a file processing environment in which image attributes and print attributes are obtained from the attributes of the file, a reduction image to which the print attributes are reflected as an image is formed on the basis of the obtained image attributes and print attributes, and the formed reduction image is displayed by a display apparatus, thereby enabling the print attributes held in the file to be easily and visually discriminated from the displayed thumbnail image, and use convenience is excellent.

According to the invention, there is provided an information processing apparatus by which a file which holds predetermined attributes is stored in a folder structure, comprising:

designating means for designating a folder in which the file has been stored;

obtaining means for obtaining print attributes from the file stored in the folder designated by the designating means;

forming means for forming an icon which displays the file so that it can be identified and is an image to which the print attributes are reflected as an image on the basis of the print attributes obtained by the obtaining means; and display control means for displaying the icon formed by the forming means to a display apparatus.

Other features and advantages of the present invention will be apparent from the following description taken in conjunc-

BRIEF DESCRIPTION OF THE DRAWINGS

FIG. 1 is a block diagram showing an example of an information processing apparatus according to an embodiment of the invention;

FIG. 2 is a diagram showing an example of a display picture plane of a document management application of the invention which is displayed on a display apparatus shown in FIG. 1;

FIG. 4 is a diagram showing an example of a file format with print attributes in the information processing apparatus according to the invention;

FIG. 5 is a diagram showing examples of thumbnail images with print attributes which are formed on the basis of the format of the file with the print attributes shown in FIG. 4;

FIG. 12 is a diagram for explaining a memory map in a memory medium for storing various data processing programs which can be read out by an information processing system to which the information processing apparatus according to the invention can be applied.

DETAILED DESCRIPTION OF THE PREFERRED EMBODIMENT

Figure 3:
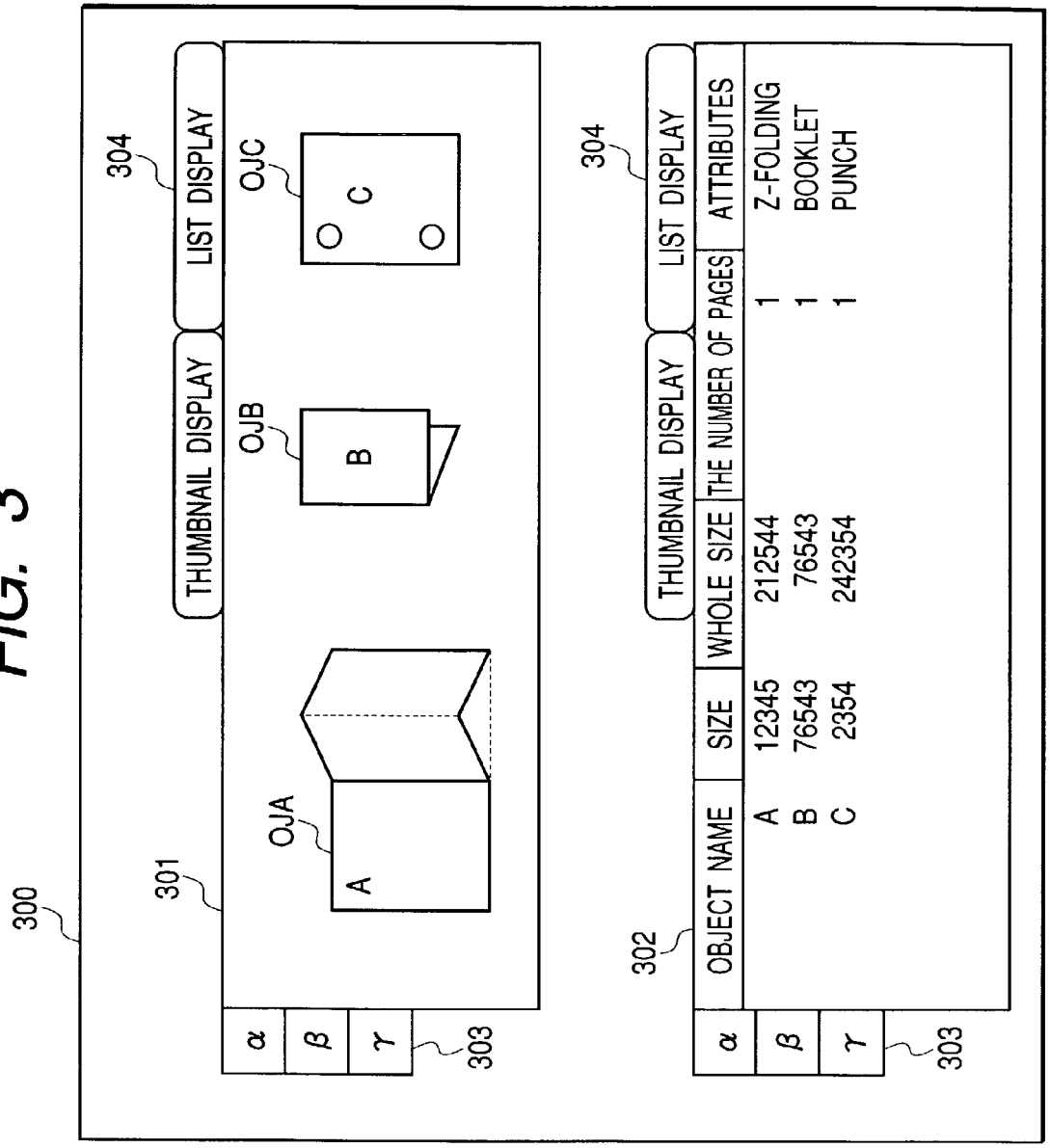
FIG. 3 is a diagram showing an example of a thumbnail image display picture plane in a document display area 315 of the document management application which is displayed on the display apparatus shown in FIG. 2.

FIG. 1 is a block diagram showing an example of an information processing apparatus according to an embodiment of the invention and corresponds to an example of the information processing apparatus which can execute a thumbnail image display process, which will be explained hereinlater.

In an information processing apparatus (PC) 200 in FIG. 1, reference numeral 201 denotes a display apparatus such as CRT, liquid crystal monitor, or the like and 203 indicates a central processing unit (CPU). The CPU 203 is constructed in a manner such that an OS for allowing an input process from an input apparatus 202 to be stored into an external storing apparatus 204 loads various applications into a memory 205 and controls their executing processes, thereby enabling a desired data process or image process to be executed. The input apparatus 202 corresponds to a pointing device such as keyboard, mouse, or the like. The external storing apparatus 204 is a non-volatile memory of a large capacity such as a hard disk or the like. Various programs (also including a document management application of the invention) and a data file have been stored in the external storing apparatus 204. A data file with print attributes (a text file with print attributes, an image file with print attributes), which will be explained in the embodiment, a conventional data file without print attributes, and the like have been stored in a directory structure managed by the OS. Reference numeral 206 denotes an external interface for communicating with an external apparatus.

FIG. 2 shows a whole diagram of a UI of the document management application (document management program) of the invention. The document management application is constructed mainly by a main window 311, a search result list 321, and a document viewer 331. The main window 311 is a window for handling each data file stored in the information processing apparatus. Reference numeral 312 denotes a menu operating area of a Windows standard for activating a function. There are operation items such as "file", "edit", "display", "tool", "setup", "help", etc. in this menu operating area. Reference numeral 313 denotes a tool bar in which characteristic functions in the area 312 are displayed as "tool buttons" and 314 indicates a tree view for displaying a folder construction in the case where folders have been stored in a database in the present application. An arbitrary folder can be selected by this tree view. Reference numeral 315 denotes an area where a document existing in the folder area selected by the tree view is displayed in a thumbnail mode or a list mode, and this area will be explained hereinlater at 300 in FIG. 3. Reference numeral 316 denotes an area for registering a printer icon or another application and this area is called an output area. By dropping the document displayed in the area 315 to the icon in the area 316, the document can be printed by a printer or opened by the relevant application. Reference numeral 317 denotes a status bar of the Windows standard; 321 a window for displaying a search result; and 331 the viewer for displaying an image showing contents of the document selected by the user from the thumbnail icon of the document displayed in the document display area 315. It is assumed that application data stored in the main window 311 is handled by each corresponding application.

FIG. 3 is a diagram showing a display picture plane for explaining in detail the document display area 315 described in FIG. 2. The document display area 315 in FIG. 3 corresponds to a diagram showing an example of the thumbnail image display picture plane displayed on the display apparatus 201 shown in FIG. 1.

In the example shown in FIG. 3, reference numeral 301 denotes a thumbnail display area and corresponds to a state where a plurality of data files existing in a storing area selected in, for example, the repository display area 314 (also called a storing location designating area), specifically speaking, a storing area α in the external storing apparatus 204 are displayed in a thumbnail format. The thumbnail display area 301 corresponds to a display state where there are three objects OJA, OJB, and OJC at present.

Reference numeral 302 denotes a list display area and corresponds to a case where a plurality of data files existing in the storing area selected in the repository display area 314 (storing location designating area), for example, the storing area α in the external storing apparatus 204 are displayed in a list format.

Reference numeral 303 denotes a button which is pressed, for example, when storing areas α, β, and γ in the external storing apparatus 204 are changed. In the case of operating in the repository display area 314, the button 303 is unnecessary. Reference numeral 304 denotes a display format change button. When either the thumbnail display format or the list display format is selected, the user operates the input apparatus 202, for example, the pointing device or the like, thereby instructing depression of the display format change button 304. The display format change button 304 can be also provided in the tool button 313.

In the thumbnail display area 301, a document A is a file having a Z-folding attribute. A document B is a file having a booklet attribute. Further, a document C is a file having a punch attribute. Although those attributes can overlap, it is assumed that each file does not have a contradictory attribute. Those files with the print attributes are generally provided from an application or system for a booklet process.

FIG. 4 is a diagram showing an example of a file format with print attributes in the information processing apparatus according to the invention and corresponds to an example of a format of the files with print attributes which are handled in the thumbnail image display format.

In FIG. 4, reference numeral 400 denotes a format of the file with print attributes. This file is constructed by a document data area and a print attribute area. Specifically speaking, the file is constructed by document data (actual image, resolution, direction of the image, and size of image) and print attributes (eight print attributes). That is, the document data and the print attribute information exist independently in the file with print attributes. In the case of forming a thumbnail from this file, it is assumed that an initial thumbnail is formed from the document data (actual image, resolution, direction of the image, and size of image) and this thumbnail is subsequently modified in accordance with the print attributes.

FIG. 5 is a diagram showing examples of thumbnail images with print attributes which are formed by the document management application of the invention on the basis of the format 400 of the data file with the print attributes shown in FIG. 4.

In FIG. 5, reference numeral 500 denotes a thumbnail image picture plane with print attributes and corresponds to a state where the thumbnail image with print attributes formed by the document management application in accordance with the format 400 of the data file with print attributes shown in FIG. 4 is displayed to the display apparatus 201.

In FIG. 5, a thumbnail A is a thumbnail image with a Z-folding attribute. A thumbnail B is a thumbnail image with a booklet attribute. A thumbnail C is a thumbnail image with a duplex attribute. A thumbnail D is a thumbnail image with an inserter paper attribute. A thumbnail E is a thumbnail image with a tab paper attribute. A thumbnail F is a thumbnail image with a variable attribute. A thumbnail G is a thumbnail image with a punch attribute. A thumbnail H is a thumbnail image with a staple attribute.

Programs have been stored in an external storing apparatus (FD, CD-ROM, ROM, magnetic tape, etc.) on the PC/WS side and a memory medium on the printer side. Each of the programs can be read out by a reading apparatus (not shown) in the central processing unit and stored into a storing apparatus (memory).

Naturally, the invention is also applied to the case where it is embodied by supplying the programs to the system or the apparatus.

In this case, the memory medium in which the program according to the invention has been stored constructs the invention. By reading out the program from the memory medium and storing it into the system or the apparatus, the system or the apparatus operates by a predetermined method.

Figure 6A:
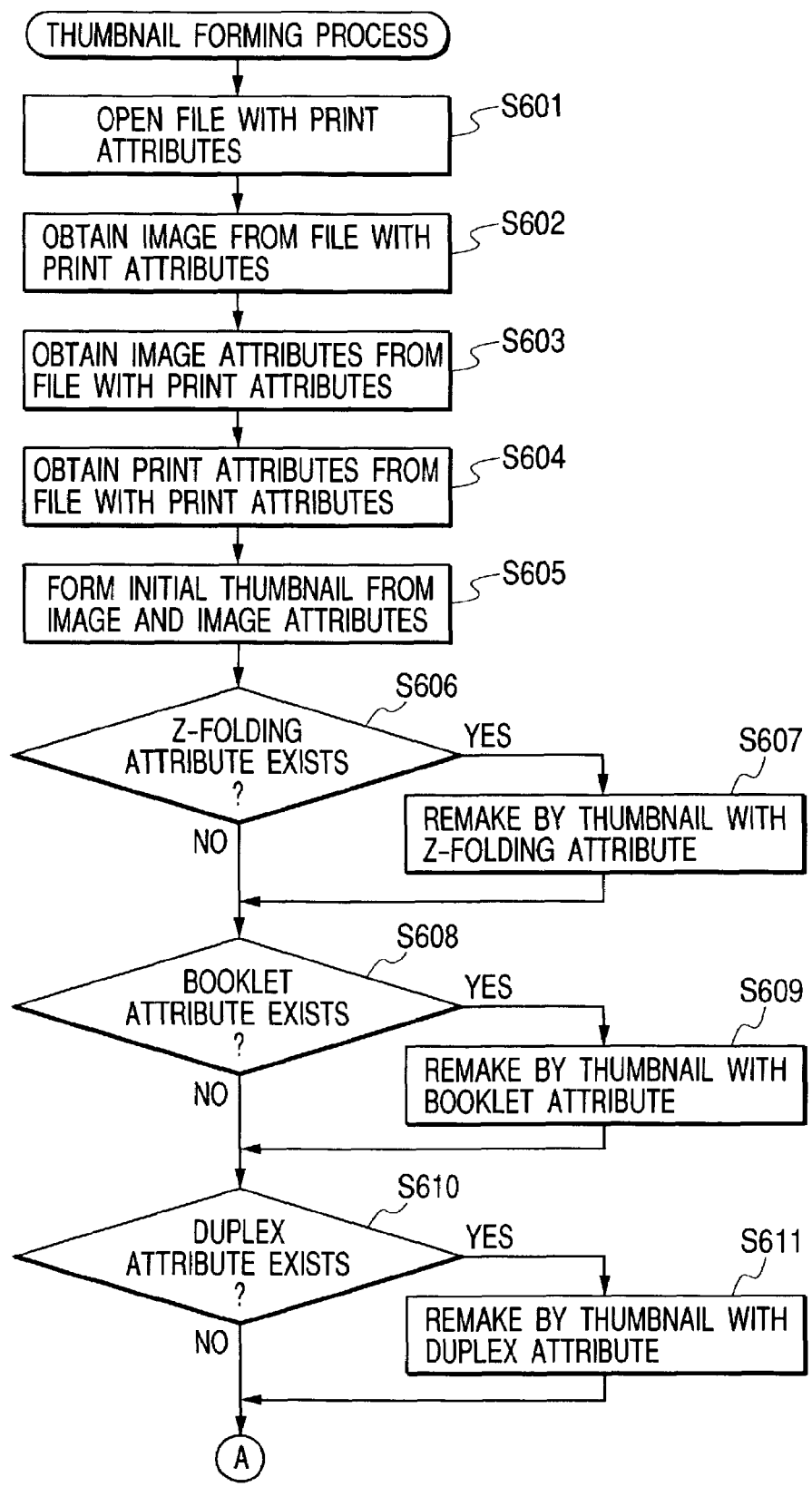
FIG. 6 is comprised of FIGS. 6A and 6B showing flowcharts illustrating an example of a data processing procedure in the information processing apparatus according to the invention.
Figure 6B:
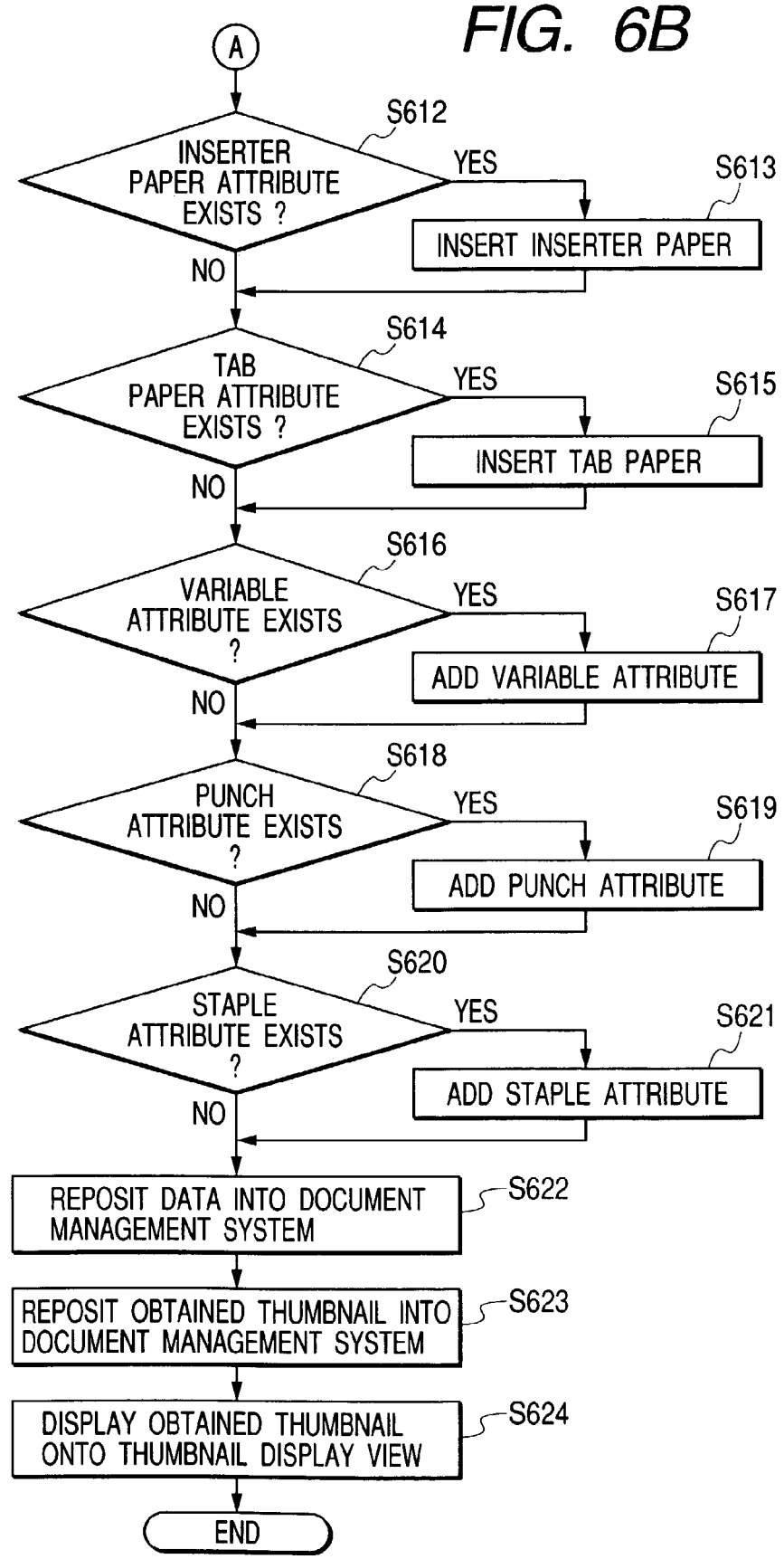

FIG. 6 is a flowchart showing an example of a data processing procedure in the information processing apparatus having the document management application (document management program) according to the invention. This flowchart corresponds to a procedure for processes for forming, repositing, and displaying a thumbnail image which are executed by the CPU 203 shown in FIG. 1 at the time when the file with print attributes is imported into the document management system. Reference numerals S601 to S624 denote processing steps. When a predetermined folder is selected in the repository display area of the document management application shown in FIG. 2, a plurality of data files existing in this folder are imported, and the present data processing procedure is started.

First, in step S601, the document management application opens the data file with print attributes or data file without print attributes (a text file of a general application or a general image file) imported into the document management system. The data file with print attributes has the file format as shown in FIG. 4. The data file without print attributes has the file format similar to the conventional one and, since this format is a file format defined by the general application or a format of the image file, its explanation is omitted.

In step S602, the document management application obtains an image from the open file in accordance with FIG. 4. The image which is used as a thumbnail can be formed by the well-known technique and its specific explanation is omitted. A thumbnail forming module which the document management application has forms the image which is used as a thumbnail by using the well-known technique. Subsequently, in step S603, the document management application similarly obtains image attributes, that is, information such as size, direction, resolution, etc. of the image from the thumbnail forming module.

Further, in step S604, the document management application discriminates whether the open data file is a data file with print attributes or not. In the case of the data file with print attributes, the print attributes, that is, Z-folding, staple, etc. are similarly obtained by using a print attribute obtaining module of the document management application. In step S605, an initial image of the thumbnail is formed from the information obtained in steps S602 and S603. In the case of the data file without print attributes, this process is skipped.

Subsequently, in step S606, the document management application discriminates whether the Z-folding attribute exists among the print attributes or not in order to execute a process for adding the print attributes obtained in step S604 to the formed initial thumbnail image. If it is determined that the Z-folding attribute exists among the print attributes, in step S607, an image is remade by the Z-folding attribute thumbnail (refer to the thumbnail A shown in FIG. 5) by using a module for forming a thumbnail with attributes in the document management application. The processing routine advances to step S608.

If it is determined in step S606 that the Z-folding attribute does not exist among the print attributes, in step S608, the document management application discriminates whether there is a booklet attribute among the print attributes or not. If it is determined that the booklet attribute exists among the print attributes, in step S609, an image is remade by the booklet attribute thumbnail (refer to the thumbnail B shown in FIG. 5) by using the module for forming the thumbnail with attributes in the document management application. The processing routine advances to step S610.

If it is determined in step S608 that the booklet attribute does not exist among the print attributes, in step S610, the document management application discriminates whether there is a duplex attribute among the print attributes or not. If it is determined that the duplex attribute exists among the print attributes, in step S611, an image is remade by the duplex attribute thumbnail (refer to the thumbnail C shown in FIG. 5) by using the module for forming the thumbnail with attributes in the document management application. The processing routine advances to step S612.

If it is determined in step S610 that the duplex attribute does not exist among the print attributes, in step S612, the document management application discriminates whether there is an inserter paper attribute among the print attributes or not. If it is determined that the inserter paper attribute exists among the print attributes, in step S613, an inserter paper attribute thumbnail is added by using the module for forming the thumbnail with attributes in the document management application (refer to the thumbnail D shown in FIG. 5). The processing routine advances to step S614.

If it is determined in step S612 that the inserter paper attribute does not exist among the print attributes, in step S614, the document management application discriminates whether there is a tab paper attribute among the print attributes or not. If it is determined that the tab paper attribute exists among the print attributes, in step S615, a tab paper attribute thumbnail is added by using the module for forming the thumbnail with attributes in the document management application (refer to the thumbnail E shown in FIG. 5). The processing routine advances to step S616.

If it is determined in step S614 that the tab paper attribute does not exist among the print attributes, in step S616, the document management application discriminates whether there is a variable attribute among the print attributes or not. If it is determined that the variable attribute exists among the print attributes, in step S617, a variable attribute thumbnail is added by using the module for forming the thumbnail with attributes in the document management application (refer to the thumbnail F shown in FIG. 5). The processing routine advances to step S618.

If it is determined in step S616 that the variable attribute does not exist among the print attributes, in step S618, the document management application discriminates whether there is a punch attribute among the print attributes or not. If it is determined that the punch attribute exists among the print attributes, in step S619, a punch attribute thumbnail is added by using the module for forming the thumbnail with attributes in the document management application (refer to the thumbnail G shown in FIG. 5). The processing routine advances to step S620.

If it is determined in step S618 that the punch attribute does not exist among the print attributes, in step S620, the document management application discriminates whether there is a staple attribute among the print attributes or not. If it is determined that the staple attribute exists among the print attributes, in step S621, a staple attribute thumbnail is added by using the module for forming the thumbnail with attributes in the document management application (refer to the thumbnail H shown in FIG. 5). The processing routine advances to step S622.

If it is determined in step S620 that the staple attribute does not exist among the print attributes, in step S622, the document management application reposits the imported data into the document management system. Subsequently, in step S623, the thumbnail image formed in the above step is reposited into the document management system. In step S624, the thumbnail image is displayed to a thumbnail display view (refer to FIG. 5) in the window on the display apparatus 201. The processing routine is finished.

Thus, in addition to the thumbnail formed on the basis of the actual image obtained from the file with print attributes, the print attributes (Z-folding, punch, etc.) are added to the thumbnail and the resultant thumbnail image can be displayed. The displayed image can be easily distinguished from another document in the document management system.

Although the embodiment has been described with respect to the case where the CPU 203 executes the process for forming, repositing, and displaying the thumbnail image at the time when the file with print attributes is imported into the document management system, the invention can be also applied to the case of directly repositing the file into the document management system from the booklet application or the case of uploading the file into a document management system for WEB.

As a file which is stored into the external storing apparatus 204, either a file which is read out from a portable memory medium that is attached to a predetermined image processing apparatus and written or a file which is obtained from an external apparatus via a network can be used.

Although the embodiment has been described with respect to the case where the image attributes and the print attributes are obtained from the attributes of the file, a reduction image to which the print attributes are reflected as an image is formed on the basis of the obtained image attributes and print attributes, and the formed reduction image is displayed to the display apparatus, the invention is not always limited to the reduction image showing the image attributes, but any image is incorporated in the purview of the invention so long as it is displayed by an icon so that such a file can be distinguished from another file.

Although the embodiment has been described above with respect to the case where all of the print attributes of the file are displayed as a thumbnail, it is also possible to control the display in a manner such that the user designates a specific print attribute and only the files having the designated print attribute are displayed or a thumbnail of the files which hold the print attributes other than the designated print attribute is displayed.

Figure 7:
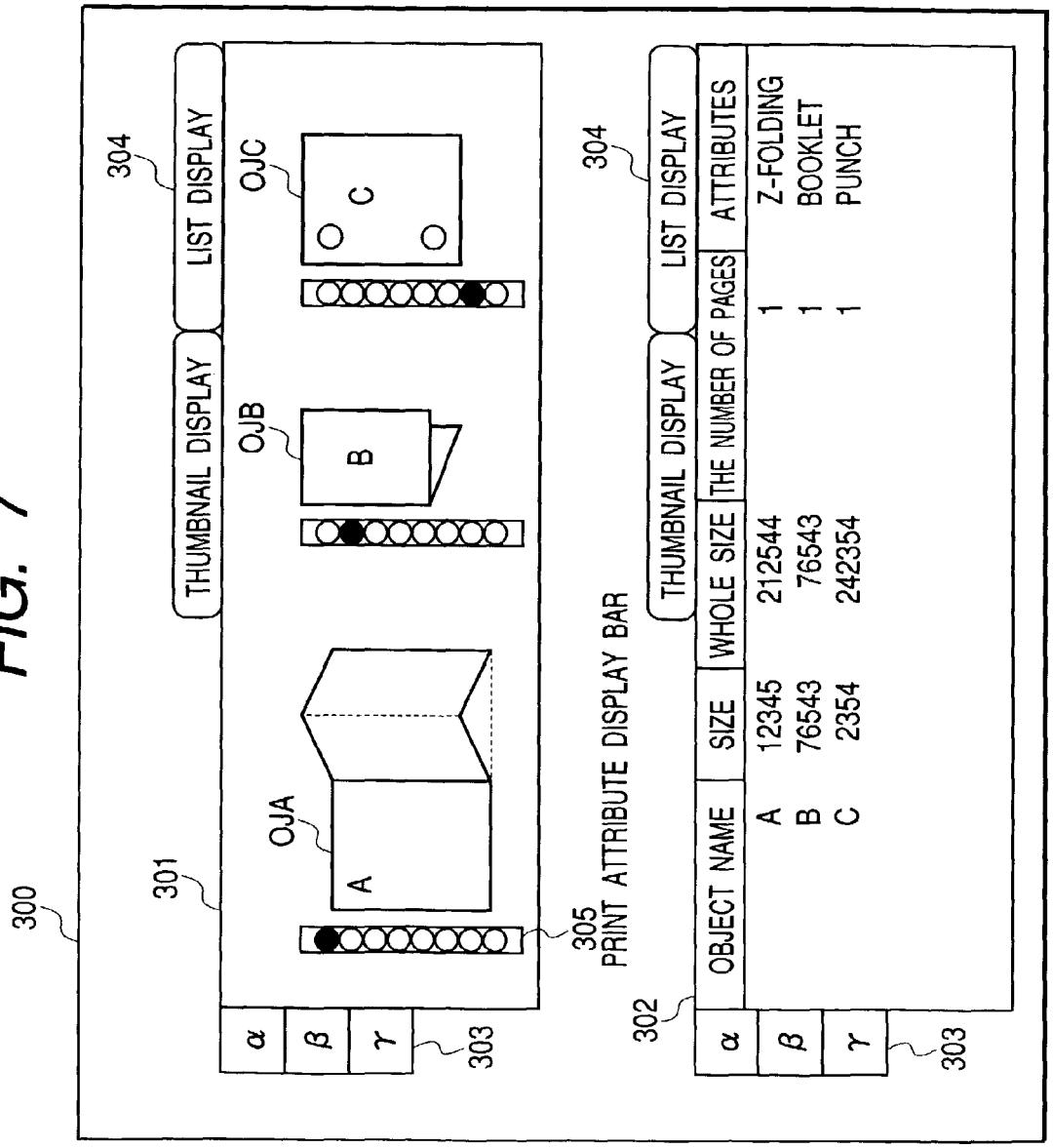
FIG. 7 is a diagram showing an example of the thumbnail image display picture plane in the document display area 315 of the document management application which is displayed on the display apparatus shown in FIG. 2.

FIG. 7 is a diagram showing a modification of the thumbnail image display picture plane which is displayed on the display apparatus 201 shown in FIG. 3 and corresponds to a schematic diagram of the main window of the document display area 315 for displaying a list of images in the storing area of the document management system. Portions similar to those in FIG. 3 are designated by the same reference numerals and their descriptions are omitted.

In the example shown in FIG. 7, reference numeral 305 denotes a print attribute display image (print attribute display bar) which is an index showing kinds of print attributes which can be handled by the PC 200. A plurality of buttons are arranged in the vertical direction along a file image and it is assumed that the button at the attribute position corresponding to the print attribute which is held is displayed in a display format different from those of the buttons at the other positions. In FIG. 7, "●" denotes a light-on state and "○" indicates a light-off state.

In the thumbnail display area 301, the document A is a file having the Z-folding attribute. The document B is a file having the booklet attribute. Further, the document C is a file having the punch attribute. Although those attribute can overlap, it is assumed that the files do not have contradictory attributes. Such a file with print attributes is usually provided from an application or system for a booklet process.

As mentioned above, the print attribute display image (print attribute display bar) as an index showing the kinds of print attributes is displayed near the thumbnail image (icon) by the document management application of the invention.

Figure 8:
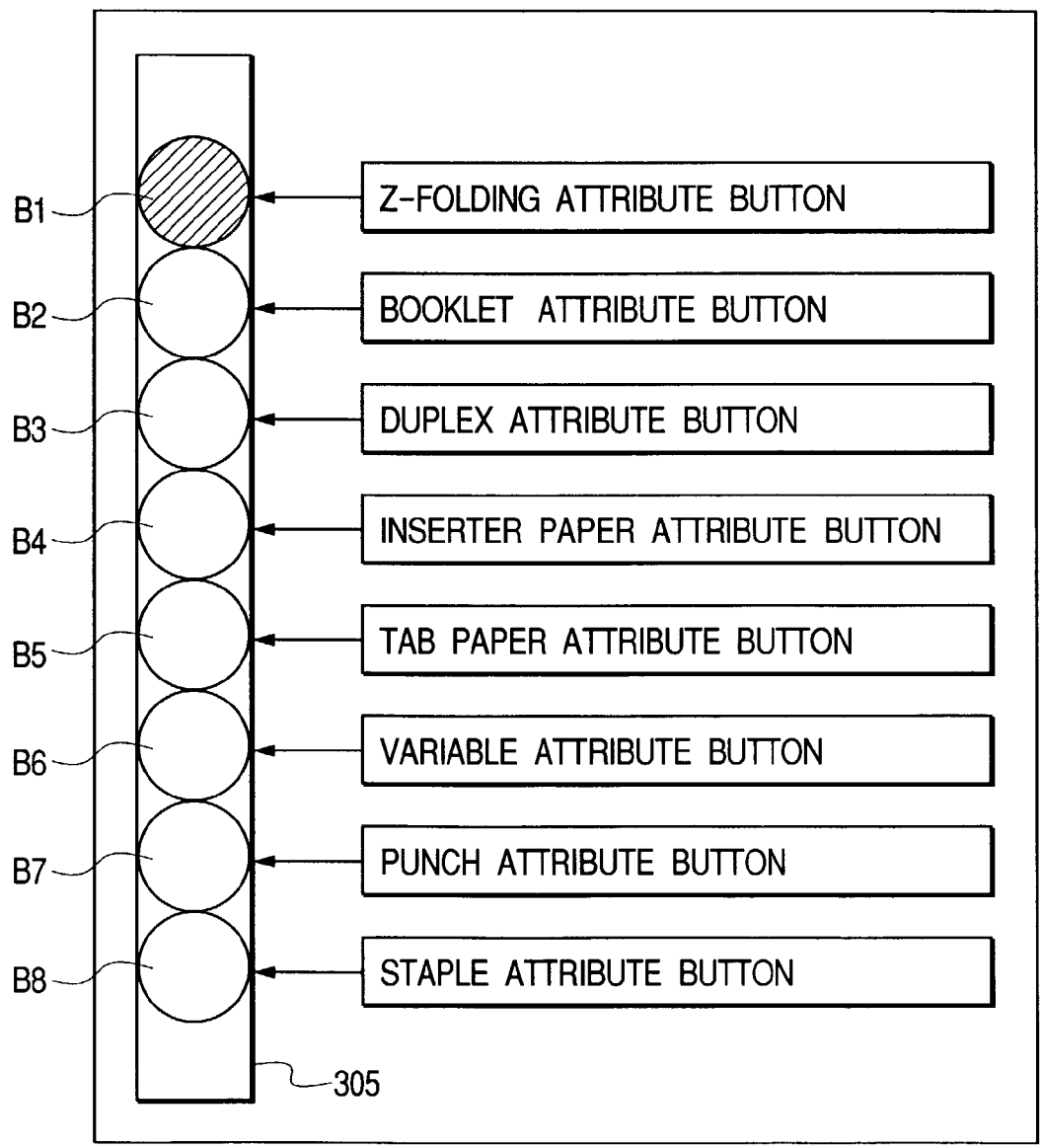
FIG. 8 is a diagram for explaining a construction of a print attribute display bar shown in FIG. 7.

FIG. 8 is a diagram for explaining a construction of the print attribute display image 305 shown in FIG. 7.

In FIG. 8, with respect to one document, there are eight buttons B1 to B8 indicative of respective attributes. The button B1 is indexed as a Z-folding attribute button. The button B2 is indexed as a booklet attribute button. The button B3 is indexed as a duplex attribute button. The button B4 is indexed as an inserter paper attribute button.

The button B5 is indexed as a tab paper attribute button. The button B6 is indexed as a variable attribute button. The button B7 is indexed as a punch attribute button. The button B8 is indexed as a staple attribute button.

If one document has a plurality of print attributes, since all of the print attribute buttons corresponding to them are lit on, the print attributes can be easily discriminated.

Figure 9:
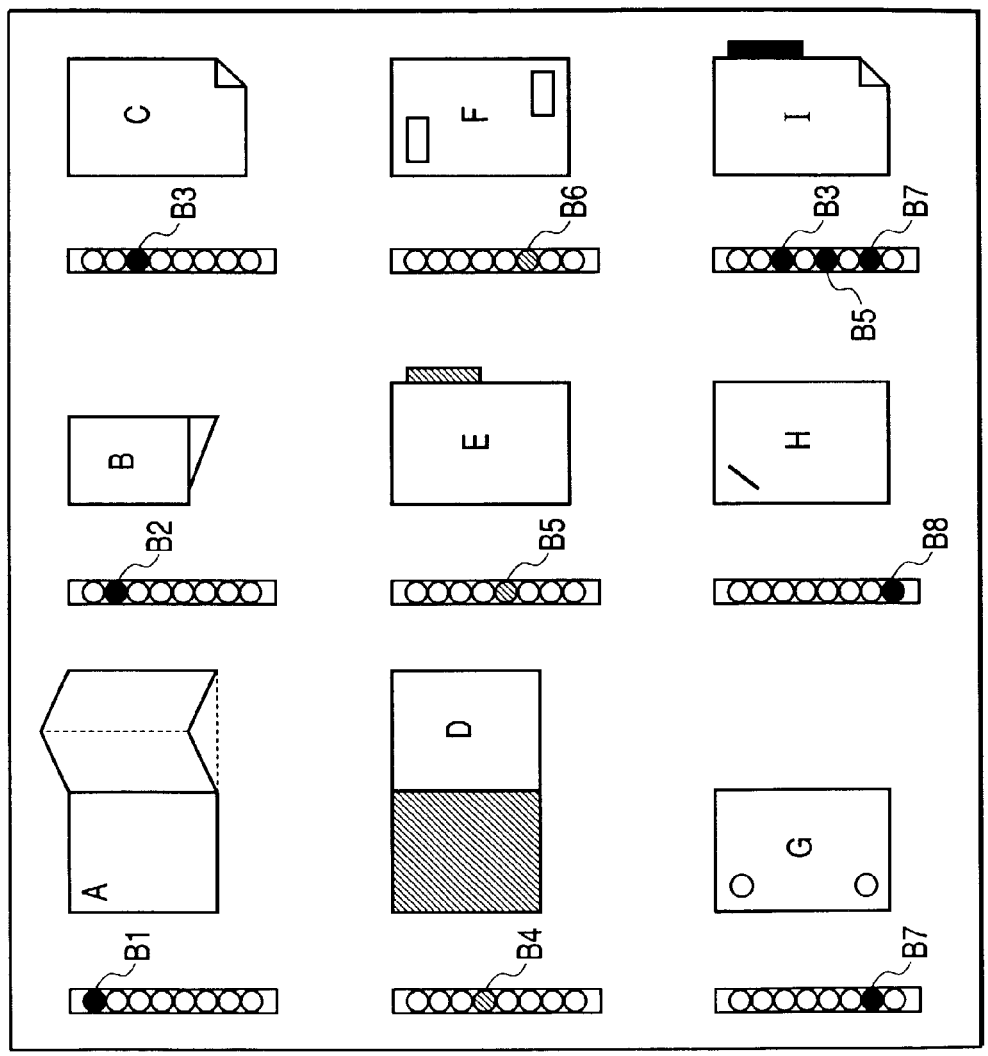
FIG. 9 is a diagram showing examples of thumbnail images with print attributes which are formed on the basis of the format of the file with the print attributes shown in FIG. 4.

FIG. 9 is a diagram showing examples of thumbnail images with print attributes which are formed on the basis of the format 400 of the file with the print attributes shown in FIG. 4 and corresponds to the case where the thumbnail images with print attributes are displayed in a state with the print attribute display image 305.

FIG. 9 shows a picture plane of the thumbnail images with print attributes and corresponds to a state where print attribute images are formed in accordance with the format 400 of the file with print attributes shown in FIG. 4 and thumbnail images with print attributes are further formed and displayed on the display apparatus 201. In the embodiment, it is assumed that a bar formed from the print attributes is added and the whole thumbnail image with print attributes is called a thumbnail image.

In FIG. 9, the thumbnail A is a thumbnail image with the Z-folding attribute. The thumbnail B is a thumbnail image with the booklet attribute. The thumbnail C is a thumbnail image with the duplex attribute. The thumbnail D is a thumbnail image with the inserter paper attribute. The thumbnail E is a thumbnail image with the tab paper attribute. The thumbnail F is a thumbnail image with the variable attribute. The thumbnail G is a thumbnail image with the punch attribute. The thumbnail H is a thumbnail image with the staple attribute.

The thumbnail image I is a thumbnail with the three attributes of, for example, the duplex attribute, the tab paper attribute, and the punch attribute. The three buttons B3, B5, and B7 of the print attribute display image 305 are simultaneously lit on.

Figure 10A:
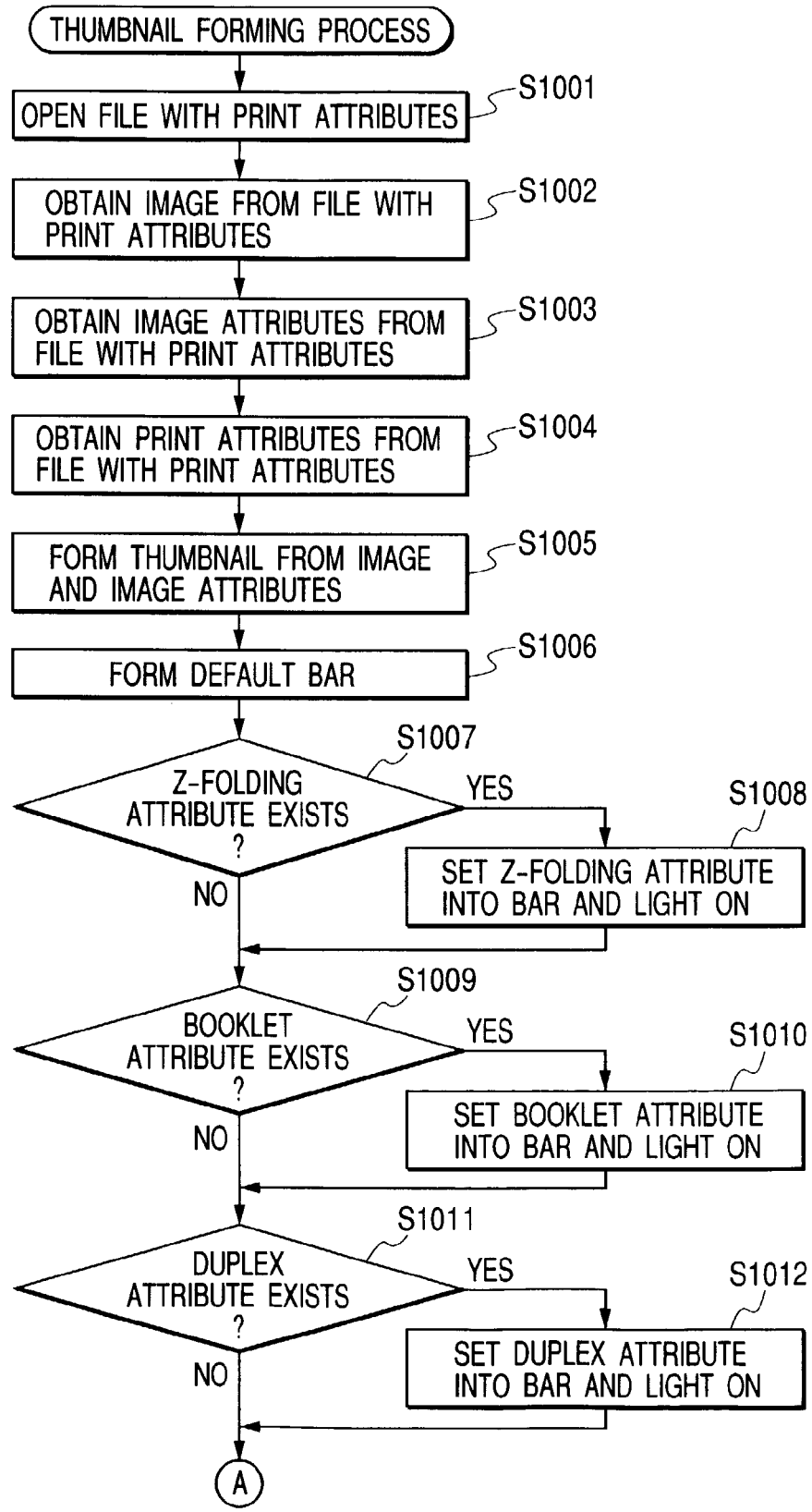
FIG. 10 is comprised of FIGS. 10A and 10B showing flowcharts illustrating an example of the data processing procedure in the information processing apparatus according to the invention.
Figure 10B:
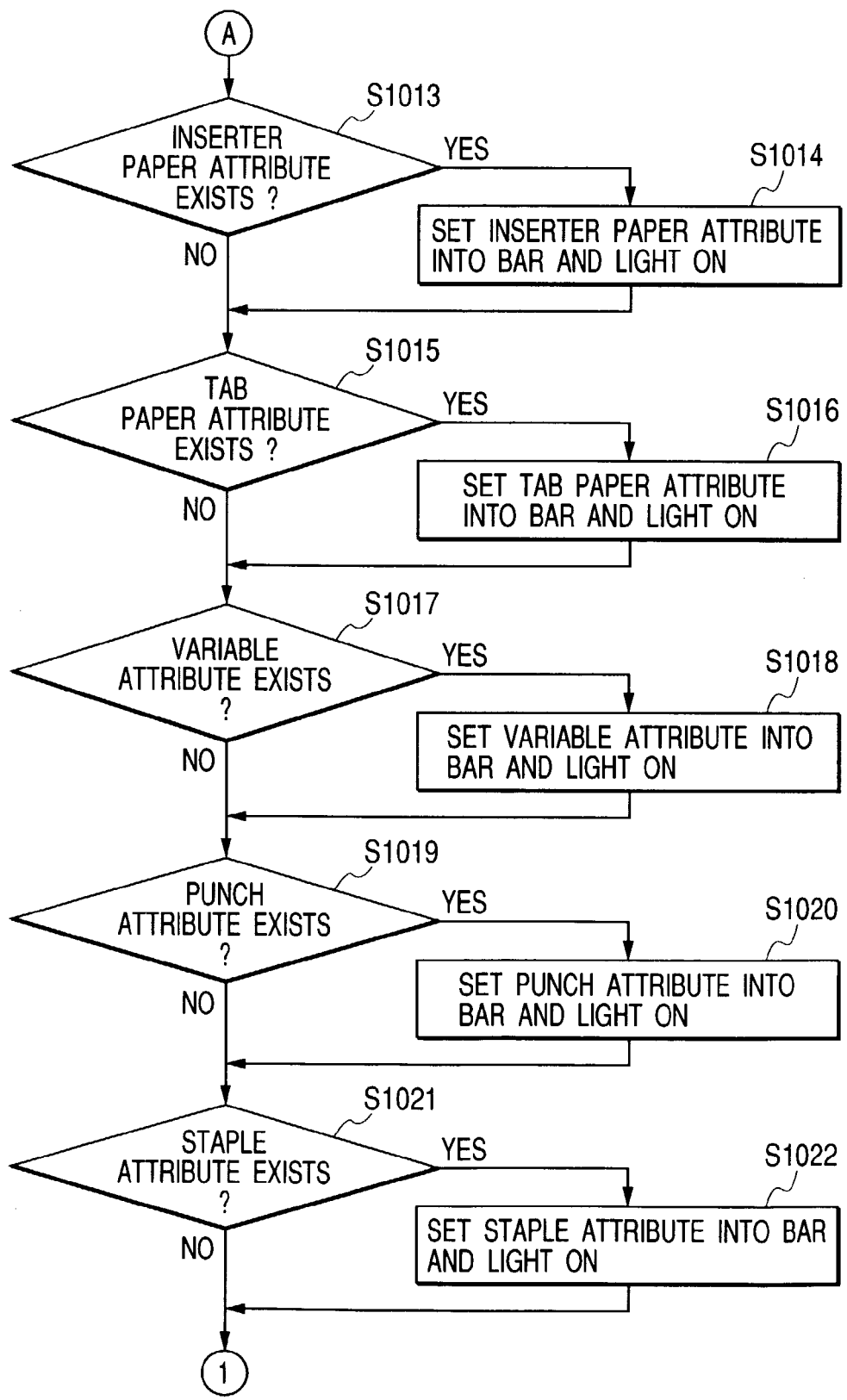
Figure 11:
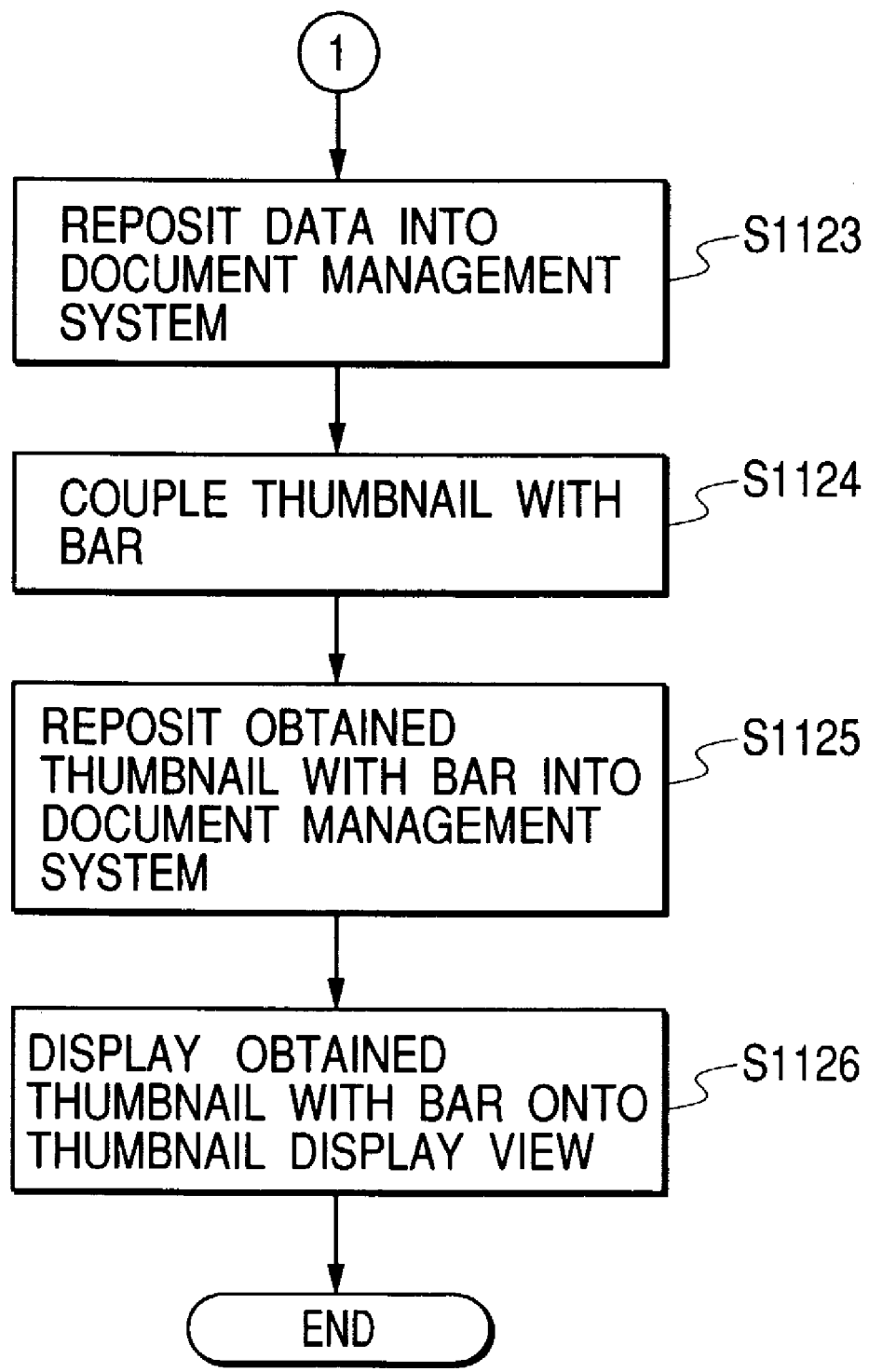
FIG. 11 is a flowchart showing an example of the data processing procedure in the information processing apparatus according to the invention.

FIGS. 10A, 10B and 11 are flowcharts showing an example of the data processing procedure in the information processing apparatus according to the invention and correspond to the procedure for the forming, repositing, and displaying processes of the thumbnail images which are executed by the CPU 203 shown in FIG. 1 at the time when the file with print attributes is imported into the document management system. S1001 to S1126 denote processing steps. This data processing procedure is started by an instructing operation similar to that in the case described in FIGS. 6A and 6B.

First, in step S1001, the document management application opens the file with print attributes imported in the document management system. The file format is as shown in FIG. 4.

In step S1002, the document management application obtains an image from the thumbnail forming module from the open file in accordance with FIG. 4. Subsequently, in step S1003, the document management application similarly obtains image attributes, that is, information such as size, direction, resolution, etc. of the image.

Further, in step S1004, the document management application similarly obtains print attributes, that is, Z-folding, staple, and the like. In step S1005, the document management application forms an initial image of the thumbnail from the information obtained in steps S1002 and S1003.

Subsequently, in step S1006, the document management application forms a default bar for displaying the print attributes. The print attributes obtained in step S1004 are added to the default bar.

In step S1007, the document management application discriminates whether the Z-folding attribute exists among the print attributes or not. If it is determined that the Z-folding attribute exists among the print attributes, in step S1008, the button B1 as a Z-folding attribute button is lit on (refer to the thumbnail A shown in FIG. 9). The processing routine advances to step S1009.

If it is determined in step S1007 that the Z-folding attribute does not exist among the print attributes, in step S1009, the document management application discriminates whether the booklet attribute exists among the print attributes or not. If it is determined that the booklet attribute exists among the print attributes, in step S1010, the button B2 as a booklet attribute button is lit on (refer to the thumbnail B shown in FIG. 9). The processing routine advances to step S1011.

If it is determined in step S1009 that the booklet attribute does not exist among the print attributes, in step S1011, the document management application discriminates whether the duplex attribute exists among the print attributes or not. If it is determined that the duplex attribute exists among the print attributes, in step S1012, the button B3 as a duplex attribute button is lit on (refer to the thumbnail C shown in FIG. 9). The processing routine advances to step S1013.

If it is determined in step S1011 that the duplex attribute does not exist among the print attributes, in step S1013, the document management application discriminates whether the inserter paper attribute exists among the print attributes or not. If it is determined that the inserter paper attribute exists among the print attributes, in step S1014, the button B4 as an inserter paper attribute button is lit on (refer to the thumbnail D shown in FIG. 9). The processing routine advances to step S1015.

If it is determined in step S1013 that the inserter paper attribute does not exist among the print attributes, in step S1015, the document management application discriminates whether the tab paper attribute exists among the print attributes or not. If it is determined that the tab paper attribute exists among the print attributes, in step S1016, the button B5 as a tab paper attribute button is lit on (refer to the thumbnail E shown in FIG. 9). The processing routine advances to step S1017.

If it is determined in step S1015 that the tab paper attribute does not exist among the print attributes, in step S1017, the document management application discriminates whether the variable attribute exists among the print attributes or not. If it is determined that the variable attribute exists among the print attributes, in step S1018, the button B6 as a variable attribute button is lit on (refer to the thumbnail F shown in FIG. 9). The processing routine advances to step S1019.

If it is determined in step S1017 that the variable attribute does not exist among the print attributes, in step S1019, the document management application discriminates whether the punch attribute exists among the print attributes or not. If it is determined that the punch attribute exists among the print attributes, in step S1020, the button B7 as a punch attribute button is lit on (refer to the thumbnail G shown in FIG. 9). The processing routine advances to step S1021.

If it is determined in step S1019 that the punch attribute does not exist among the print attributes, in step S1021, the document management application discriminates whether the staple attribute exists among the print attributes or not. If it is determined that the staple attribute exists among the print attributes, in step S1022, the button B8 as a staple attribute button is lit on (refer to the thumbnail H shown in FIG. 9). The processing routine advances to step S1123.

In step S1123, the document management application reposits the imported data into the document management system.

Subsequently, in step S1124, the document management application couples the print attribute display bars formed in steps S1007 to S1022 with the initial thumbnail image formed in step S1005 or sets the system so that they are displayed near the initial thumbnail image. In step S1125, the thumbnail images formed in the above steps are reposited into the document management system. In step S1126, the thumbnail images are displayed in a thumbnail display view (refer to FIG. 9) in the window on the display apparatus 201. The processing routine is finished.

Thus, in addition to the thumbnail formed on the basis of the actual image obtained from the file with print attributes, the print attribute display image 305 to identify the print attributes (Z-folding, punch, etc.) held in each file can be displayed. The relevant document can be easily distinguished from another document in the document management system.

Although the embodiment has been described above with respect to the case of executing the forming, repositing, and displaying processes of the thumbnail image which are executed by the CPU 203 when the file with print attributes is imported into the document management system, the invention can be also applied to the case of directly repositing the file from the booklet application into the document management system or the case of uploading it to the document management system for WEB.

As files which are stored into the external storing apparatus 204, files which are read out from a portable memory medium which is loaded into a predetermined image processing apparatus and written or files which are obtained from the external apparatus via the network can be used.

Although the embodiment has been described above with respect to the case of displaying thumbnails of all of the print attributes of the files, it is also possible to control the system in a manner such that the user designates a specific print attribute and only the files having the designated print attribute or thumbnails of the files which hold the print attributes other than the designated print attribute are displayed.

Although the embodiment has been disclosed above with respect to the examples in which the image attributes and the print attributes are obtained from the attributes of the file, the reduction image to which the print attributes are reflected as an image is formed on the basis of the obtained image attributes and print attributes and the print attribute image which indexes the print attributes is formed on the basis of the obtained print attributes, the embodiment is not limited to the example of displaying such a bar but can be also applied to another example. For instance, an image showing the print attributes by characters can be also used as such an example. A construction of a data processing program which can be read out by an information processing system to which the information processing apparatus according to the invention can be applied will be described hereinbelow with reference to a memory map shown in FIG. 12.

FIG. 12 is a diagram for explaining the memory map in a memory medium for storing various data processing programs which can be read out by the information processing system to which the information processing apparatus according to the invention can be applied.

Although not shown in particular, there is also a case where information to manage a group of programs which are stored into the memory medium, for example, version information, implementor, and the like are also stored, and information depending on the OS or the like on the program reading side, for example, icons for identifying and displaying the programs and the like are also stored.

Further, data depending on various programs is also managed in the directory. There is also a case where a program for installing various programs into a computer or, in the case where the program to be installed has been compressed, a program for decompressing the program, and the like are stored.

The functions shown in FIGS. 6A, 6B, 10A, 10B and 11 in the embodiment are executed by a host computer in accordance with a program which is installed from the outside. In such a case, the invention is also applied to a case where a group of information including the program is supplied to an output apparatus by a memory medium such as CD-ROM, flash memory, FD, or the like or from an external memory medium via the network.

Naturally, the objects of the invention are accomplished by a method whereby as mentioned above, a memory medium in which program codes of software to realize the functions of the embodiment mentioned above have been recorded is supplied to a system or an apparatus and a computer (or a CPU or an MPU) of the system or the apparatus reads out the program codes stored in the memory medium and executes them.

In such a case, the program codes themselves read out from the memory medium realize the novel functions of the invention. The memory medium which stores the program codes constructs the invention.

As a memory medium for supplying the program codes, for example, a floppy (registered trademark) disk, a hard disk, an optical disk, a magnetooptic disk, a CD-ROM, a CD-R, a magnetic tape, a non-volatile memory card, a ROM, an EEPROM, or the like can be used.

Naturally, the invention incorporates not only a case where a computer executes the read-out program codes, so that the functions of the embodiment mentioned above are realized but also a case where an OS (Operating System) or the like which is operating on the computer executes a part or all of actual processes on the basis of instructions of the program codes, and the functions of the embodiment mentioned above are realized by those processes.

Further, the invention incorporates a case where the program codes read out from the memory medium are written into a memory provided for a function expanding board inserted in a computer or a function expanding unit connected to a computer and, thereafter, a CPU or the like provided for the function expanding board or the function expanding unit executes a part or all of actual processes on the basis of instructions of the program codes, and the functions of the embodiment mentioned above are realized by those processes.

As many apparently widely different embodiments of the present invention can be made without departing from the spirit and scope thereof, it is to be understood that the invention is not limited to the specific embodiments thereof except as defined in the appended claims.

As described above, according to the invention, in the information processing apparatus which can store a file which holds predetermined attributes, there is an effect such that the file processing environment in which the print attributes held in the file can be easily and visually discriminated from a displayed thumbnail can be freely constructed, or the like.

Further, naturally, according to the invention, in the information processing apparatus which can store a file which holds predetermined attributes, the image attributes and the print attributes are obtained from the attributes in the file, the reduction image to which the print attributes are reflected as an image is formed on the basis of the obtained image attributes and print attributes, and the formed reduction image is displayed to the display apparatus. Therefore, there is an effect such that when the file is thumbnail displayed, the file processing environment in which the print attributes held in the relevant file can be easily and visually discriminated from the displayed thumbnail can be freely constructed, or the like.

Moreover, according to the invention, the reduction image to which the print attributes are reflected as an image and the bars serving as indices showing the print attributes are formed on the basis of the image attributes and the print attributes and displayed to the display apparatus. Thus, there is an effect such that when the file is thumbnail displayed, the file processing environment in which the print attributes held in the relevant file can be easily and visually discriminated from the displayed thumbnail can be freely constructed, or the like.

What is claimed is:

1. A document management apparatus for storing a document file which holds predetermined attributes in a folder structure, comprising:
    a processor for executing computer-executable code; and
    a computer-readable storage medium on which is stored computer-executable code that, when executed by the processor, performs the steps of:
    designating a folder in which the document file is stored;
    obtaining a print attribute and an image attribute from the document file stored in the folder designated by said designating step;
    forming an icon which indicates the document file so that it can be identified on the basis of the print attribute and the image attribute obtained by said obtaining step, the icon representing an image of the print attribute and a reduction image showing contents of a first page of the document file on the basis of the image attribute, and forming a print attribute image bar which indexes the print attribute on the basis of the obtained print attribute; and
    a display control step of controlling a display apparatus to display the icon and the print attribute image bar formed by said forming step, wherein said display control step controls the display apparatus to display the print attribute image bar in a position near the reduction image.

2. An apparatus according to claim 1, wherein said display control step can control the display apparatus to display a list of the predetermined attributes including the print attribute, and further comprising a step of switching said display control step between displaying the list and displaying the icon.

3. An apparatus according to claim 1, wherein the document file includes an image and text.

4. An apparatus according to claim 1, wherein the print attribute includes at least one of a Z-folding attribute, a booklet attribute, a duplex attribute, an inserter paper attribute, a tab paper attribute, a variable attribute, a punch attribute, and a staple attribute.

5. An apparatus according to claim 1, wherein the document file is formed by an application.

6. An apparatus according to claim 1, wherein the document file is read out from a portable memory medium which is loaded into a predetermined image processing apparatus.

7. A document management method in a document management apparatus which stores a document file which holds predetermined attributes in a folder structure, comprising:
    a designating step of designating a folder in which the document file is stored;
    an obtaining step of obtaining a print attribute and an image attribute from the document file stored in the folder designated by said designating step;
    a forming step of forming an icon which indicates the document file so that it can be identified on the basis of the print attribute and the image attribute obtained by said obtaining step, the icon representing an image of the print attribute and a reduction image showing contents of a first page of the document file on the basis of the image attribute, and forming a print attribute image bar which indexes the print attribute on the basis of the obtained print attribute; and
    a display control step of controlling a display apparatus to display the icon and the print attribute image bar formed by said forming step, wherein said display control step controls the display apparatus to display the print attribute image bar in a position near the reduction image.

8. A method according to claim 7, wherein in said display control step, a display apparatus can be controlled to display a list of said predetermined attributes including the print attribute, and said method further comprises a switching step of switching said display control step between displaying the list and displaying the icon.

9. A method according to claim 7, wherein the document file includes an image and text.

10. A method according to claim 7, wherein the print attribute includes at least one of a Z-folding attribute, a booklet attribute, a duplex attribute, an inserter paper attribute, a tab paper attribute, a variable attribute, a punch attribute, and a staple attribute.

11. A method according to claim 7, wherein the document file is formed by an application.

12. A method according to claim 7, wherein the document file is read out from a portable memory medium which is loaded into a predetermined image processing apparatus.

13. A computer-executable document management program comprised of computer-executable code stored on a computer readable storage medium which is executed by a document management apparatus that stores a document file which holds predetermined attributes in a folder structure, the program comprising:
    a designating step of designating a folder in which the document file is stored;
    an obtaining step of obtaining a print attribute and an image attribute from the document file stored in the folder designated by said designating step;
    a forming step of forming an icon which indicates the document file so that it can be identified on the basis of the print attribute and the image attribute obtained by said obtaining step, the icon representing an image of the print attribute and a reduction image showing contents of a first page of the document file on the basis of the image attribute, and forming a print attribute image bar which indexes the print attribute on the basis of the obtained print attribute; and
    a display control step of controlling a display apparatus to display the icon and the print attribute image bar formed by said forming step, wherein said display control means controls the display apparatus to display the print attribute image bar in a position near the reduction image.

14. A program according to claim 13, wherein said display control step is controlled to display a list of the predetermined attributes including the print attribute, and said method further comprises a switching step of switching said display control step between displaying the list and displaying the icon.

15. A program according to claim 13, wherein the document file includes an image and text.

16. A program according to claim 13, wherein the print attribute includes at least one of a Z-folding attribute, a booklet attribute, a duplex attribute, an inserter paper attribute, a tab paper attribute, a variable attribute, a punch attribute, and a staple attribute.

17. A program according to claim 13, wherein the document file is formed by an application.

18. A program according to claim 13, wherein the document file is read out from a portable memory medium which is loaded into a predetermined image processing apparatus.

* * * * *